United States Patent
Zeng (10) Patent No.: US 10,865,335 B2
(45) Date of Patent: Dec. 15, 2020

(54) QUARTZ SAND/GRAPHITE COMPOSITE MOLTEN SALT HEAT TRANSFER AND HEAT STORAGE MEDIUM AND PREPARATION METHOD THEREOF

(71) Applicant: SHENZHEN ENESOON SCIENCE & TECHNOLOGY CO., LTD., Guangdong (CN)

(72) Inventor: ZhiYong Zeng, Shenzhen (CN)

(73) Assignee: SHENZHEN ENESOON SCIENCE & TECHNOLOGY CO., LTD., Shenzhen (CN)

( * ) Notice: Subject to any disclaimer, the term of this patent is extended or adjusted under 35 U.S.C. 154(b) by 27 days.

(21) Appl. No.: 14/765,295

(22) PCT Filed: Jan. 21, 2014

(86) PCT No.: PCT/CN2014/070970
§ 371 (c)(1),
(2) Date: Jul. 31, 2015

(87) PCT Pub. No.: WO2014/117663
PCT Pub. Date: Aug. 7, 2014

(65) Prior Publication Data
US 2015/0368534 A1 Dec. 24, 2015

(30) Foreign Application Priority Data

Feb. 1, 2013 (CN) .......................... 2013 1 0040070
Feb. 1, 2013 (CN) .......................... 2013 1 0040909
(Continued)

(51) Int. Cl.
*C09K 5/00* (2006.01)
*C09K 5/12* (2006.01)
(Continued)

(52) U.S. Cl.
CPC .................. *C09K 5/12* (2013.01); *C09K 3/18* (2013.01); *C09K 5/00* (2013.01); *C09K 5/02* (2013.01); *C09K 5/063* (2013.01)

(58) Field of Classification Search
CPC ... C09K 5/00; C09K 5/02; C09K 5/06; C09K 5/063; C09K 5/12; C09K 3/18
(Continued)

(56) References Cited

U.S. PATENT DOCUMENTS 2,375,758 A * 5/1945 Bates ........................ C09K 5/12
148/28
3,447,968 A * 6/1969 Rightmire ............. F24F 3/1603
429/112
(Continued)

FOREIGN PATENT DOCUMENTS

CN 1263924 A 8/2000
CN 101508888 A 8/2009
(Continued)

OTHER PUBLICATIONS

Pacheco et al. "Development of a molten-salt thermocline thermal storage system for parabolic trough plants", Journal of Solar Energy Engineering, May 2002, vol. 124, p. 153-159.*
(Continued)

Primary Examiner — Jane L Stanley
(74) Attorney, Agent, or Firm — Maschoff Brennan (57) ABSTRACT

The present invention relates to the solar photo-thermal power generation technology. Provided is a quartz sand/graphite composite molten salt heat transfer and heat storage medium and a preparation method thereof. The medium is characterized in that it is prepared by adding quartz sand into an existing common heat transfer and heat storage molten salt system for compounding. Hot stability of the obtained heat transfer and heat storage medium is generally
(Continued)

improved, an application temperature range is expanded, causticity is reduced, and a service life of a device is greatly prolonged. In addition, a material cost is low.

4 Claims, 1 Drawing Sheet

(30) Foreign Application Priority Data

Dec. 26, 2013 (CN) .......................... 2013 1 0731924
Dec. 26, 2013 (CN) .......................... 2013 1 0732738

(51) Int. Cl.
*C09K 5/02* (2006.01)
*C09K 3/18* (2006.01)
*C09K 5/06* (2006.01)

(58) Field of Classification Search
USPC .................................................... 252/70, 74
See application file for complete search history.

(56) References Cited

U.S. PATENT DOCUMENTS

| | | | |
|---|---|---|---|
| 3,692,551 A * | 9/1972 | Weaver | B22C 9/105 106/38.3 |
| 4,259,401 A * | 3/1981 | Chahroudi | E04C 1/392 126/618 |
| 4,421,662 A * | 12/1983 | Fiorucci | C01D 9/16 252/70 |
| 4,840,219 A * | 6/1989 | Foreman | B22C 1/18 106/38.3 |
| 7,588,694 B1 | 9/2009 | Bradshaw et al. | |
| 7,971,437 B2 * | 7/2011 | Flynn | F28D 20/021 60/659 |
| 8,091,613 B2 * | 1/2012 | Bank | F28D 9/0031 165/10 |
| 9,038,709 B2 * | 5/2015 | Bank | F28F 23/00 165/10 |
| 10,351,748 B2 * | 7/2019 | Zeng | C09K 5/12 |
| 2008/0276616 A1 * | 11/2008 | Flynn | F02C 6/14 60/641.15 |
| 2009/0095476 A1 * | 4/2009 | Nguyen | E21B 36/04 166/302 |

FOREIGN PATENT DOCUMENTS

CN 102533226 A 7/2012
DE 102010061741 A1 5/2012

OTHER PUBLICATIONS

Flueckiger et al., "An integrated thermal and mechanical investigation of molten-salt thermocline energy storage", Applied Energy, Jan. 2011, vol. 88, p. 2098-2105.*
Yang et al., "Thermal analysis of solar thermal energy storage in a molten-salt thermocline", Solar Energy, Apr. 2010, vol. 84, p. 974-985.*
Derwent abstracts CN 101508888 published Aug. 19, 2009, to Ding et al. (Year: 2009).*

* cited by examiner

QUARTZ SAND/GRAPHITE COMPOSITE MOLTEN SALT HEAT TRANSFER AND HEAT STORAGE MEDIUM AND PREPARATION METHOD THEREOF

TECHNICAL FIELD

The invention is related to heat transfer and heat storage composite medium of solar thermal power generation and especially the compound silica sand or graphite molten salt heat transfer and heat storage medium and preparation method.

BACKGROUND TECHNOLOGY

In industrial storage energy and solar thermal power generation technology, at present the mediums used for heat transfer and heat storage mainly are air, water, heat transfer oil, molten salt, sodium and aluminum metal etc. As molten salt has wide operating temperature range, lower vapor pressure, low viscosity, good stability and low cost etc many features, it has became the potential heat transfer and heat storage medium of solar thermal power generation technology and more mature heat transfer and heat storage medium and applied very often.

The outstanding advantages of nitrate molten salt system are that it has wide sources of raw materials, low cost, small corrosiveness and that it will not decompose generally below 500° C., therefore the nitrate molten salt has very large advantage comparing with other molten salts. At present, the mediums used for overseas solar thermal power generation power station mainly are binary nitrate system (40% $KNO_3$-60% $NaNO_3$) and ternary nitrate system ($KNO_3$—$NaNO_3$—$NaNO_2$).

The operating temperature of binary nitrate system is 260-565° C. High-limit temperature is relatively high and ideal, but melting point is relatively high to cause high maintenance cost of obnubilation. Nitrate molten salt has the weak points that dissolution heat is relatively is small and heat conductivity is low. Partial overheat can be generated easily when it is used. The adopted binary nitrate molten salt system at home is 55% $KNO_3$-45% $NaNO_2$, generally the melting point of which is low to 132° C. The maintenance cost is reduced, but the operating temperature of upper limit is reduced correspondingly.

The melting point of ternary nitrate system is relatively low and ideal. But the operating temperature of upper limit is relatively low, the heat of dissolution is small and heat conductivity is relatively low.

The melting point of polybasic nitrate molten salt is low but the operating temperature of upper limit is low.

In order to solve the above-mentioned problem, China Patent 201110425668.7 discloses one kind of $KNO_3$—$NaNO_3$—$Ca(NO_3)_2$ system. Its operating temperature range is 180-550° C. Its melting point is reduced greatly comparing with binary nitrate. The maintenance cost is reduced. But the stability of calcium nitrate is not good, it decomposes when it is heated to 132° C. It has oxidability and give off oxygen when it is heated. It combusts and explodes when it meets organics and sulfur.

China Patent application 00111406.9 discloses one kind of $LiNO_3$—$KNO_3$—$NaNO_3$—$NaNO_2$ system. Its operating temperature range is 250-550° C. The operating temperature of upper limit of this system is higher than ternary nitrate system. It reaches 550° C. But its lower-limit operating temperature is increased too to increase the maintenance cost of obnubilation, however the adding of $LiNO_3$ increases the corrosion and cost.

U.S. Pat. No. 7,588,694B1 discloses one kind of $LiNO_3$—$KNO_3$—$NaNO_3$—$Ca(NO_3)_2$ system. Its melting point is lower than 100° C. Its operating temperature of upper limit is higher than 500° C. But the adding of $LiNO_3$ increases the corrosion and cost of molten salt.

The raw materials published by existing technology can be used for improving the performance of heat transfer and heat storage medium are those reported in the above documents such as adding of lithium nitrate or calcium nitrate in the nitrate molten salt system or the additives sodium chloride and lithium carbonate adopted in one kind of molten salt system containing lithium carbonate ($Na_2CO_3$, $K_2CO_3$, $NaCl$, $Li_2CO_3$) disclosed by China Patent 200910037348.7 maintain the upper limit of high and safe operating temperature of system with melting point low to 390° C. effectively. But in the practical application, such melting point is still high. It causes blocking of pipeline easily or too high maintenance cost. How to reduce the melting point of carbonate molten salt effectively becomes one important direction of solar thermal power generation and thermal storage.

Silica sand (Quartz sand) is one kind of ceramic materials. Its unique molecular chain structure, crystal shape and the change rule of crystal lattice make it have the advantages of resisting high temperature, small coefficient of thermal expansion, high insulation, resisting oxidation and chemical corrosion. It plays more and more important role in many high-technology products and is used for manufacturing glass, fireproof materials, smelting ferrosilicon, flux for metallurgy, ceramic abrasive substance and casting raw materials and chosen as industrial heat accumulator substantially. So far, there is no report that silica sand is put into molten salt as the heat transfer and heat storage medium as the fields of industrial energy storage and utilizing solar high temperature heat. So far, there is no such report that graphite is applied in the industrial energy-saving field and the field of utilizing solar high-temperature heat.

Graphite is one kind of allotropic modification of element carbon. Three carbon atoms is ligated around each carbon atom (several hexagons arranged in cellular way) and bonded in covalent bond to compose covalent molecule. Due to its special structure, graphite has the following special properties:

1.) High-temperature resistance: The melting point of graphite is 3850±50° C. Its boiling point is 4250° C. The loss of weight is very small even if it is burnt through ultra high-temperature electric arc. The coefficient of thermal expansion is very small too. The strength of graphite is strengthened with the rising of temperature. The strength of graphite is doubled when the it is 2000° C.

2.) Electric conduction and thermal conductivity: The electric conduction of graphite is 100 times higher than general nonmetallic mine. Its thermal conductivity is higher than steel, iron and lead etc metallic materials. The coefficient of thermal conductivity is reduced with the rising of temperature. Even in extreme high temperature, graphite becomes thermal insulator.

3.) Lubricating property: The lubricating property of graphite depends on the size of graphite flake. The larger the flake is, the smaller the friction coefficient and the better the lubricating property is.

4.) Chemical stability: Graphite has good chemical stability under normal temperature. It can resist the corrosion of acid, alkali and organic solvent.

5.) Fabricability: The toughness of graphite is good. It can be crushed into very thin flake.

6.) Thermal shock resistance: Graphite can bear the drastic change of temperature and can not be destroyed when it is used under the normal temperature. When the temperature changes abruptly, the volume of graphite does not change a lot and no crack can be produced.

SUMMARY OF INVENTION

Based on the blankness and demand of the above fields, the invention provides one kind of new heat transfer and heat storage medium and its preparation method. It is the first time that silica sand and graphite are applied in heat transfer and heat storage medium and obtain good improvement of performance such as thermal stability and heat transfer performance. The cost of system is reduced and the demands on the equipment of heat transfer and heat storage is lowered, therefore some shortcomings in the molten salt system used very often are overcame. The technical plan of the invention is:

Heat transfer and storage medium compounded with silica sand, characterized in that, it is compounded by adding silica sand in heat transfer and storage molten salt system.

The mentioned heat transfer and heat storage molten salt systems said heat transfer and storage molten salt system are nitrate molten salt system, carbonate molten salt system. The mentioned heat transfer and heat storage molten salt system is binary nitrate molten salt system; said binary nitrate molten salt system occupies 50~99% of total weight of said heat transfer and storage medium; said silica sand takes 1~50% of total weight of said heat transfer and storage medium. The mentioned binary nitrate molten salt system takes 50~80% of total weight of said heat transfer and storage medium; said silica sand occupies 20~50% of total weight of said heat transfer and storage medium.

The said binary nitrate molten salt system occupies 60~80% of total weight of said heat transfer and storage medium; said silica sand occupies 20~40% of total weight of said heat transfer and storage medium.

The said binary nitrate molten salt system occupies 60~70% of total weight of said heat transfer and storage medium; said silica sand occupies 30~40% of total weight of said heat transfer and storage medium The said binary nitrate molten salt system is $KNO_3$—$NaNO_3$ system: wherein, potassium nitrate: 30-60 parts; sodium nitrate: 30-60 parts.

The said binary nitrate molten salt system is $KNO_3$—$NaNO_2$ system: wherein, potassium nitrate: 30-60 parts; sodium nitrite: 40-70 parts The said heat transfer and storage molten salt system is ternary nitrate molten salt system; said ternary nitrate molten salt system occupies 50~99% of total weight of said heat transfer and storage medium; said silica sand occupies 1~50% of total weight of said heat transfer and storage medium.

Said nitrate molten salt occupies 50~90% total weight of said heat transfer and storage medium; said silica sand occupies 10~50% of total weight of said heat transfer and storage medium.

said ternary nitrate molten salt system and its components thereof by part of weight are as follows: $KNO_3$—$NaNO_3$—$NaNO_2$ system; wherein, potassium nitrate: 40-80 parts; sodium nitrate: 5-15 parts; sodium nitrite: 10-50 parts.
Said ternary nitrate molten salt system and its components by part of weight are as follows: $KNO_3$—$NaNO_3$—$Ca(NO_3)_2$ system: wherein, potassium nitrate: 5-40 parts; sodium nitrate: 5-25 parts; calcium nitrate: 10-70 parts.

Said heat transfer and storage molten salt system is multiple nitrate molten salt system; said multiple nitrate molten salt system occupies 50~99% of total weight of said heat transfer and storage medium; said silica sand takes 1~50% of total weight of said heat transfer and storage medium The said multiple nitrate molten salt system occupies 50~90% of total weight of heat transfer and storage medium; said silica sand occupies 10~50%.

Said multiple nitrate molten salt system is $KNO_3$—$NaNO_3$—$NaNO_2$—$CsNO_3$ system, $KNO_3$—$NaNO_3$—$NaNO_2$—$Ca(NO_3)_2$ system, $KNO_3$—$NaNO_3$—$NaNO_2$—$LiNO_3$ system $KNO_3$—$NaNO_3$—$CsNO_3$—$Ca(NO_3)_2$ system, $KNO_3$—$NaNO_3$—$LiNO_3$—$CsNO_3$ system or $KNO_3$—$NaNO_3$—$NaNO_2$—$CsNO_3$—$Ca(NO_3)_2$ system.

The components of said $KNO_3$—$NaNO_3$—$NaNO_2$—$CsNO_3$ system by part of weight are as follows: potassium nitrate 40 parts-80 parts; sodium nitrate 5 parts-15 parts, sodium nitrate 20-50 parts, cesium nitrate 1 part-10 parts;

The components of said $KNO_3$—$NaNO_3$—$NaNO_2$—$Ca(NO_3)_2$ system by part of weight are as follows: potassium nitrate 40 parts-80 parts, sodium nitrate 5 parts-15 parts, sodium nitrite 20 parts-50 parts, calcium nitrate 1 parts-10 parts;

The components of $KNO_3$—$NaNO_3$—$NaNO_2$—$LiNO_3$ by part of weight are as follows: potassium nitrate 40 parts-80 parts, sodium nitrate 5 parts-15 parts, sodium nitrite 20 parts-50 parts, lithium nitrate 1 parts-10 parts;

The components of said $KNO_3$—$NaNO_3$—$CsNO_3$—$Ca(NO_3)_2$ system by part of weight are as follows: potassium nitrate 40 parts-80 parts, sodium nitrate 5 parts-15 parts, cesium nitrate 20 parts-50 parts, calcium nitrate 1 part-10 parts;

The components of said $KNO_3$—$NaNO_3$—$LiNO_3$—$CsNO_3$ system by part of weight are as follows: potassium nitrate 40 parts-80 parts, sodium nitrate 5 parts-15 parts, lithium nitrate 20 parts-50 parts, cesium nitrate 1 parts-10 parts;

The components of said $KNO_3$—$NaNO_3$—$NaNO_2$—$CsNO_3$—$Ca(NO_3)_2$ by part of weight are as follows: potassium nitrate 40 parts-80 parts, sodium nitrate 5 parts-15 parts, sodium nitrite 10 parts-50 parts, cesium nitrate 10 parts-30 parts, calcium nitrate 10 parts-30 parts.

Said heat transfer and storage molten salt system is carbonate molten salt system: $K_2CO_3$—$Na_2CO_3$.

The components of $K_2CO_3$—$Na_2CO$ system by part of weight are as follows: potassium carbonate 30-60 parts, sodium carbonate 30-60 parts.

The heat transfer and storage molten salt system are carbonate molten salt system: $K_2CO_3$—$Na_2CO_3$—$NaCl$—$Li_2CO_3$ system; the components of said $K_2CO_3$—$Na_2CO_3$—$NaCl$—$Li_2CO_3$ system by part of weight are as follows: potassium carbonate 20-60 parts, sodium carbonate 20-40 parts, lithium carbonate 10-20 parts, sodium chloride 5-10 parts.

The proportion of said silica sand in said heat transfer and storage medium is 1~50%;
The proportion of said silica sand in said heat transfer and storage medium is 10~40%;
The proportion of said silica sand in said heat transfer and storage medium is 20~45%;
The proportion of said silica sand in said heat transfer and storage medium is 30~40%.

Heat transfer and storage medium compounded with graphite, it is compounded by adding graphite in heat transfer and storage molten salt system. The heat transfer and storage molten salt system refers to $KNO_3$—$NaNO_3$—$Ca(NO_3)_2$, wherein, potassium nitrate: 5-40 parts; sodium nitrate: 5-25 parts; calcium nitrate: 10-70 parts, and graphite occupies 1-50%.

The application of one of the above-mentioned heat transfer and heat storage medium in industrial energy storage or solar thermal power generation.

Figure 1:
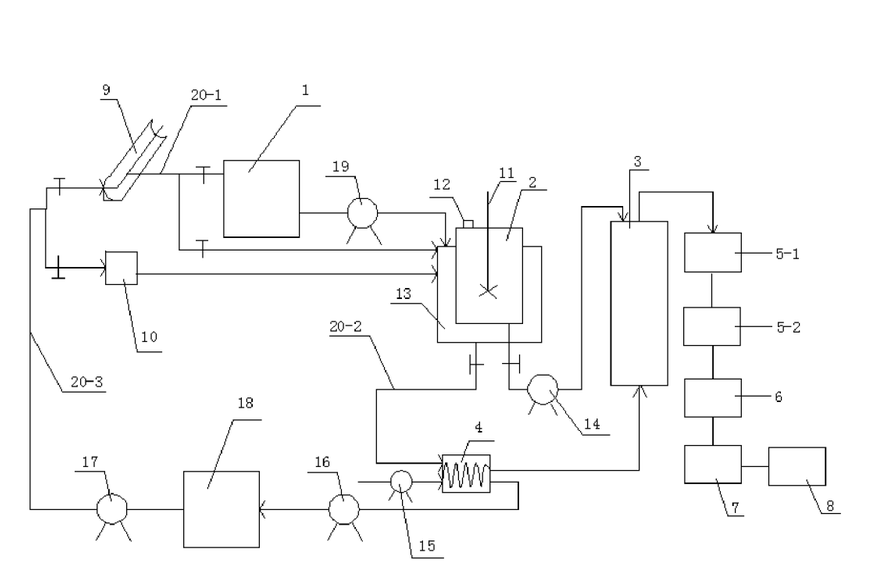
FIG. 1: The Schematic diagram of device used for molten salt preparation in this invention.
- 1—: High temperature storage tank
- 2—: Molten salt tank,
- 3—: Gas flow dryer
- 4—: Heat exchanger
- 5-1: Granulating device
- 5-2: Cooling device
- 6—: Storage bin
- 7—Packaging device
- 8—Storage device
- 9—Solar collector system
- 10—Portable electric tracing
- 11—Stirring device
- 12—Feed inlet
- 13—Interlayer cavity
- 14—High-temperature molten salt pump
- 15—Blowers
- 16,17,18 Heat carrier pump,
- 18—Cryogenic storage tank
- 20-1,20-2,20-3—Heat carrier pipe.

Preparation method of the heat transfer and storage medium for any one of the above heat transfer and heat storage medium, characterized in that, the following molten salt preparation equipments are adopted:

said equipments include heat source device, molten salt tank with interlayer (2), gas flow crushing dryer (3), granulating device (5-1), cooling device (5-2) and output device; said heat source device includes heat carrier bearing cavity; said heat carrier bearing cavity is connected with the interlayer of said molten salt tank (2) through heat carrier pipeline (20-1);

said molten salt tank (2), gas flow crushing dryer (3), granulating device (5-1), cooling device (5-2) and output device are connected through molten salt pipeline; said molten salt pipeline is stretched out from the lower end of said molten salt tank (2) and connected with the upper end of gas flow crushing dryer (3); the lower end of said gas flow crushing dryer (3) is connected with heat exchanger (4);

said heat source device refers to solar collector system (9), mobile electric tracing (10) or mutually independently controlled and parallel installed solar collector system (9) and mobile electric tracing (10);

steps are as follows:

raw materials formed in proportion of heat transfer and storage molten salt system are added into said molten salt tank (2) with interlayer; after heating to molten state by starting heat source device, silica sand or graphite in proportion is added; system is heated continuously and stirred to be uniform;

the uniform compound molten salt through heating is aspirated into gas flow crushing dryer (3) for gas flow crushing and drying, to obtain heat transfer and storage medium of molten salt compounded with silica sand/graphite, which is outputted by output device after granulating and cooling.

The heat carrier pipeline (20-1) between the mentioned solar heat collecting system (9) and the mentioned molten salt tank are set as two independently mutually controlled pieces.

High-temperature storage tank (1) is set on one piece. Heat-carrier pump (19) is set between the mentioned high-temperature storage tank (1) and the mentioned molten salt tank with jacketing (2).

High-temperature molten salt pump (14) is set between the molten salt tank (2) with jacketing and the mentioned gas flow crushing dryer (3).

The bottom of inner chamber of the jacketing of the mentioned molten salt tank (2) with jacketing is connected with the mentioned heat exchanger (4) through one passage of heat-carrier pipeline (20-2).

The mentioned heat exchanger (4) is connected with the mentioned heat source device through one passage of heat-carrier pipeline (20-3). Low-temperature storage tank (18) is set in the mentioned heat-carrier pipeline (20-3). Heat-carrier pump (16) and (17) are set on the heat-carrier pipeline (20-3) on two ends of the mentioned low-temperature storage tank (18).

The mentioned molten salt tank (2) includes stirring device (11) and feeding inlet (12) too.

The mentioned output device includes stock house (6), packing plant (7) and or storage device (8).

At least one heat-carrier pump is installed on one of passage of the mentioned heat-carrier pipeline.

molten salt preparation equipment adopted in one of the above-mentioned methods.

Silica sand or graphite is adopted as the compound material of the molten salt for the first time for the invention. Silica sand is one kind of solid and wear-resisting silicate minerals with stable chemical property. Its main component is $SiO_2$. A small quantity of content of impurities such as $Fe_2O_3$, $Al_2O_3$, CaO, MgO, $Na_2O$ etc are often contained in mineral. Melting point is around 1723° C. Boiling point is around 2230° C. It has good performance of resisting high temperature, oxidation and chemical corrosion. The content of silicon oxide adopted for the silica sand used for the invention is larger than 75% of common silica sand.

Experimental results show that the industrial cost of adding the heat transfer and heat storage medium obtained from silica sand preparation in nitrate molten salt system and carbonate molten salt system is low. It has very slight corrosiveness on heat storage system. It has the following advantages and positive results comparing with original molten salt system.

1. The heat transfer and heat storage medium prepared by this invention has the heat transfer performance of original molten salt system and improves the heat stability and upper limit operating temperature as well. The solidifying point of molten salt keeps unchanged basically.

2. The latent heat of phase change of the heat transfer and heat storage medium prepared by the invention is large. The density of energy storage is high. It lowers the requirements on the size of heat storage system and energy. The utilization rate of energy is high. The energy-saving effect is good.

In the preferred implementation plan of the invention, silica sand occupies 1~50%. The higher the silica sand content is, more obvious the cost is lowered. The upper limit temperature can be guaranteed to be improved and melting point can be guarantee not to be increased within this scope. More fine the granularity of the introduced silica sand is, more even the system transfer heat.

Experimental data shows that

After adding silica sand in the $K_2CO_3$—$Na_2CO_3$ binary carbonate system for the invention, loss rate is lowered obviously for 30 hours continuously under 800 degrees celsius comparing with original binary carbonate. It means that heat stability is improved. Though the detection of differential scanner, it shows that melting point is lower to 540 degrees celsius. It means that it is more wide than original operating temperature range and the the latent heat of phase change is increased. On the other side, the cost of silica sand is lower than that of chloride. It will reduce cost greatly for solar thermal power generation and industrial energy-saving field as the raw material of this kind of consumptive substance.

After adding silica sand in the $K_2CO_3$—$Na_2CO_3$—NaCl—$Li_2CO_3$ system for the invention, the loss rate is lowered obviously for 30 hours continuously under 850 degrees celsius comparing with original system. It means that thermal stability is improved. Through the detection of differential scanner, the results show that melting point is lowered to around 350~400 degrees celsius. It is more wide than original operating temperature range and the latent heat of phase change is increased. On the other side, after adding silica sand, the cost of raw material of the whole system is lowered obviously.

The silica sand adopted for the invention modifies the heat transfer and heat storage molten salt system. It lowers the cost of raw materials as a whole and does not weaken the key characteristics of original system at all. It improves the thermal stability of original system, latent heat of phase change and has more wide operating temperature range. It can be used widely in solar thermal power generation industry and is good at promoting the development of the industry.

The invention provides technical proposal of modifying the heat transfer and heat storage molten salt system by adopting graphite. It has the following special characteristics due to the special structure of graphite: high-temperature resistance, electric conduction, thermal conductance, lubricating property, chemical stability and thermal shock resistance. Experimental results show that the thermal stability and heat transfer performance of the heat transfer and heat storage medium with graphite added provided by the invention is improved obviously.

Technical Terms

The melting point in the invention is referred to the temperature measured under the normal pressure by adopting differential scanner during the process of heating.

The invention provides the preparation process used for preparing the carbonate molten salt of the invention in large scale. The steps depend on one set of devices put forward by the invention. The advantages and innovation points of this set of processes and devices are as follows:

The process is as follows:

1. Add different components of molten salt system into molten salt tank according to certain order. Under certain temperature and pressure condition, heat the molten salt tank to make the viscosity of molten salt to be stirred mechanically and start machine to stir for certain time to reach even system. Heat source device provides the energy needed for heating. Heating device can select mobile electric tracing or solar heating collection. If it is on site where the fuel is used, such as solar thermal power station, the accumulative solar energy and energy saving can be used directly.

2. Start high-temperance molten salt pump and open discharge port. Pour the even molten salt system in the molten salt tank above the gas flow crushing dryer. At the same time, pump the hot air from the bottom of gas flow crushing dryer into dryer. Two are in contrary way. Purpose: make the liquid-phase molten salt mixed system to form dry and even powder directly through gas flow crushing dryer. On the one side, it is easy for packing and selling. On the other side, the performance is uniform and stable when it is used. The molten salt in powder state obtained from gas flow dryer is cooled to indoor temperature through cooling device and then put into bunker, packing and storage.

3. When heat source device is solar heating collection system, lead the heat carrier (high-temperature heat conduction oil or molten salt or overheat vapor) in the jacketing of molten salt tank to heat exchanger to heat the needed hot air to utilize fully the afterheat of used heat carrier. It improves the heat utilization efficiency of the process is improved wholly.

Advantage 1:

The heat source device of the invention provides the following three plans: Plan 1 The present invention uses the heat energy provided by the accumulated solar energy as a heat source, which is energy saving and environmental protection. It can be used to provide heat in four ways: the slot type, the tower type, the dish type and the linear Fresnel lens field of solar thermal power generation gathering solar energy. From the point of view of cost and technical maturity, preferably select the trough type and the tower type.

The first way: Choose the slot mirror field thermal power generation as a way to gather solar energy. Heat molten salt tank directly through the high-temperature heat carrier in the heat collector. Currently the common high-temperature heat carriers are high temperature molten salt, heat-transfer oil and super heated steam, preferably selecting heat-transfer oil in the slot mirror field.

The second way: use the tower mirror-field of thermal power generation as a way of gathering solar energy. Heat the molten salt tank through the high-temperature heat carrier in the heat absorber. Currently the common high-temperature heat carriers are high temperature molten salt, heat-transfer oil and super heated steam, preferably selecting heat-transfer oil in the slot mirror field.

Plan 2 The heating source can be provided by mobile electric tracing as well. The mobile electric tracing is different from traditional wound heating cables. It is more convenient and simple to maintain.

Plan 3 The solar collector system and mobile electric heating tracing are individually controlled and be used in parallel, they play a complementary role, for example when solar radiation is not adequate, electric tracing makes the supplement.

Advantage 2:

The amount of heat of the hot air into gas flow crushing dryer is from the afterheat of the heat carrier in the interlayer of molten sand tank, using heat with maximum efficiency.

Advantage 3:

The temperature and pressure of molten salt tank can be controlled.

Advantage 4:

The particles of the final product is fine and uniform.

EMBODIMENTS

Describe the invention in details by combining detailed embodiment as follows:

Experimental Data

Ordinary silica sand (silica content is larger than 75%), 100 sieve number is purchased from Shandong Hongtai Silica Sand factory.

Graphite: commercially purchase available

Potassium nitrate, sodium nitrate, sodium nitrite, cesium nitrate, calcium nitrate, and lithium nitrate: Industrial pure, all of them can be purchased from general chemical products company.

Potassium carbonate, sodium carbonate, sodium chloride and lithium chloride, commercially pure grade, all of them can be purchased from general chemical products company.

The preparation process of the silica sand/graphite composite heat transfer and heat storage medium of the present invention has two options:

1. Small-scale production can be used for laboratory studies by the following steps:

Step 1. Constitute molten salt system in proportion. Put it into vacuum furnace to heat to dewater and degas to make it to be molten status. When it is heated, the temperature is 50-100° C. above the temperature of phase change of molten salt.

Step 2, Take the silica sand/graphite in proportion, then add them into the molten molten salt system of the step (1). Stir the molten salt mixture magnetically for 0.5-1 h and insulate and ultrasound for 0.5-2 h, then naturally cool to obtain a uniform and stable silica sand/graphite composite molten salt.

2. It will preferably select the molten salt technology and related matching molten salt devices in the following for large-scale production: molten salt preparation equipment: the mentioned device includes the heat source unit, molten salt tank with a interlayer cavity (13) (2) air crushing dryer (3) granulating device (5-1), cooling device (5-2) and the output device;

During the operation, add the constituted materials of molten salt system in proportion into molten salt tank (2) with jacketing. Start heat source device and heat it to molten sate and add silica sand/graphite in proportion and heat continuously to uniform molten salt system.

The uniform heated composite molten salt is pumped to a gas flow crushing dryer (3) to crush and dry gas flow to obtain the silica sand/graphite composite molten salt heat transfer and thermal storage medium, and then output by output device after being granulated and cooled.

The mentioned heat source unit includes a heat carrier bearing chamber, which is connected through the heat carrier pipe (20-1) between the carrying chamber of heat carrier and the interlayer cavity (13);

The mentioned molten salt tank (2) gas flow crushing dryer (3) the granulating device (5-1) cooling device (5-2) and the output device are connected through the molten salt pipe. The mentioned molten salt pipe extending from the lower end of molten salt tank (2) connects with the upper end of gas flow crushing dryer (3) The lower end of gas flow crushing dryer (3) is connected with the heat exchanger (4.) The Uniform molten salt system of the molten salt tank is pumped above into gas flow crushing dryer. Meanwhile the heat air is blown into dryer from the bottom of the gas flow crushing dryer. Two are contrary. Purpose: Form the liquid-phase molten salt system into dry and even powder form through gas flow crushing dryer. It is convenient to pack to sell on the one side. The performance can be uniform and stable when it is used on the other side.

The mentioned heat source devices are the solar collector system (9), mobile electric tracing (10) or independently controlled and parallel solar collector system (9) and mobile electric tracing (10). The heat source device of this device can be a single or separate solar collector system (9) and a single mobile electric tracing. It can also be controlled independently and in parallel solar collector system (9) and mobile electric tracing (10).

There are independently controlled two carrier pipes between the solar collector system (9) and the molten salt tank (20-1). One of them is provided with a high temperature storage tank (1). There is a valve between the solar collector 9 and the high temperature storage tank which is used for controlling the heat carrier flow to the high temperature storage tank 1. When the valve is closed, you can use the solar collector system 9 or a mobile electric tracing 10 directly heating the heat carrier by heating the molten salt tank 2, which is for the preparation of high temperature molten salt. When the energy is sufficient or the molten salt tank does not need to be heated, the valve between the solar collector system and the high-temperature storage tank 1 can be open. After a solar heating system heating the heat carrier, the heat carrier can be stored in the high-temperature storage tank through piping to high temperature storage tanks, when heating is required, the high-temperature molten salt preparation can be achieved by the heat carrier pump (19) pumped into the interlayer cavity (13) and further heating molten salt tank (2).

Preferably selecting the molten salt and the molten salt tank pipe between the gas flow crushing dryer (3) provided the high-temperature molten salt pump (14), which is used to draw the heated molten salt to the jet mill dryer.

Preferably selecting the interlayer cavity (13) bottom of the molten salt tank (2) and the heat exchanger (4) is connected by a period of heat carrier pipe (20-2) in communication. The pipe section of the heat carrier (20-2) for the interlayer cavity (13) of the heat carrier guided to the heat exchanger (4) for heating the required hot air from device, enabling the rest heat from heat carrier (13) of the interlayer cavity to be re-used, energy-saving and environmental protection.

Preferably selecting the heat exchanger (4) and the heat source device, connecting through a period of heat carrier pipe (20-3) in communication, provided cryogenic storage tank (18) on the heat carrier pipe (20-3), the cryogenic storage tank (18) is provided with a heat carrier pump (16) (17) at both ends of the heat carrier pipe (20-3). The heat carrier is cooling after being exhausted in the heat exchanger, which is pumping back the cryogenic storage tank through the heat carrier pipe (20-3) (16) to a, through the heat carrier pump (17) is sent back the source device and recycling use.

Preferably, the molten salt tank (2) also includes stirring device (11) and inlet (12)

Preferably mentioned output device sequentially includes build bin (6), packaging device (7) and/or storage device (8).

Each section of the mentioned heat carrier pipe is at least provided with a heat carrier pump.

Each section pipe of the above described device all is provided with sufficient valve for controlling the flow and flow direction of material in pipe. Valves on the heat carrier pipe, which is between the heat source device and molten salt tank interlayer cavity, controls the heating temperature by controlling the transmission throughput and speed of the heat carrier. the molten salt tank itself is with a pressure control device.

Embodiment 1-3. Add Silica Sand into Binary Nitrate System $KNO_3$—$NaNO_3$ to Prepare Heat Transfer and Heat Storage Medium Step 1. Prepare and compose the materials of binary nitrate molten salt system according to the formula listed in table 1 and put them into reaction kettle to heat and stir to melt solid completely and insulate for 0.5-1 h. The heating temperature is 80-120° C. over phase-transition temperature of molten salt.

Step 2. Under the condition of stirring, disperse silica sand into binary nitrate molten sand system and stir for 1-2 h continuously until the mixed substances become gel.

TABLE 1

The formula of binary nitrate molten salt in each embodiment

| Example No. | Binary nitrate molten salt system | Formula of binary nitrate system (part by weight) |
|---|---|---|
| 1 | $KNO_3$—$NaNO_3$ | Potassium nitrate: 10 parts. Sodium nitrate: 90 parts. |
| 2 | | Potassium nitrate: 30 parts. Sodium nitrate: 45 parts. |
| 3 | | Potassium nitrate: 45 parts. Sodium nitrate: 30 parts. |

Added silica sand (specification is 100 meshes) is carried out according to the following gradient. The first group: Silica sand occupies 1% of binary nitrate molten sand heat transfer and heat storage medium with three kinds of silica sands compounded. Obtain the first one to the third products. The second group: Silica sand occupies 10% of binary nitrate molten sand heat transfer and heat storage medium with three kinds of silica sands compounded. Obtain the fourth to the sixth products. The third group: Silica sand occupies 20% of binary nitrate molten sand heat transfer and heat storage medium with three kinds of silica sands compounded. Obtain the seventh to the ninth products.
The fourth group: Silica sand occupies 30% of binary nitrate molten sand heat transfer and heat storage medium with three kinds of silica sands compounded. Obtain the tenth to the twelfth products.
The fifth group: Silica sand occupies 40% of binary nitrate molten sand heat transfer and heat storage medium with three kinds of silica sands compounded. Obtain the thirteenth to the fifteenth products.
The sixth group: Silica sand occupies 50% of binary nitrate molten sand heat transfer and heat storage medium with three kinds of silica sands compounded. Obtain the sixteenth to the eighteenth products.

The contrast of each product is the corresponding binary nitrate molten salt of the product.

Step 3 Latent Heat of Phase Change Test and Melting Point Test:

Adopt universal differential scanning calorimeter (scan under atmospheric pressure).

Test results show that latent heat of phase change is increased obviously compared with contrast.

The weight percentage ratio of silica sand composite binary nitrate molten no. $KNO_3$—$NaNO_3$ molten salt system (it is the contrast at the same time).

TABLE 2

Test Results of Melting Point

| The Number of silica sand composite binary nitrate molten salt | Melting point ° C. |
|---|---|
| Contrast: potassium nitrate 10%. Sodium nitrate 90% | 270 |
| 1 | 250 |
| 4 | 254 |
| 7 | 256 |
| 10 | 270 |
| 13 | 274 |
| 16 | 278 |
| Contrast: potassium nitrate 40%. Sodium nitrate 60% | 220 |

TABLE 2-continued

Test Results of Melting Point

| The Number of silica sand composite binary nitrate molten salt | Melting point ° C. |
|---|---|
| 2 | 205 |
| 5 | 207 |
| 8 | 203 |
| 11 | 219 |
| 14 | 228 |
| 17 | 231 |
| Contrast: potassium nitrate 60%. Sodium nitrate 40% | 210 |
| 3 | 198 |
| 6 | 199 |
| 9 | 193 |
| 12 | 210 |
| 15 | 213 |
| 18 | 212 |

The melting point of products of the first group to the third group is reduced a little bit. The melting point of products of the fifth group to the sixth group is increased slightly.

Step 4. Heat Stability Test

The heat stability test is carried out on prepared 18 heat transfer and heat storage mediums and 3 binary molten nitrate salts in the control group.

The test is carried out with a gravimetric analysis: put 18 molten salts obtained in embodiments 1-3 into a nickel crucible respectively put the same into a temperature-controlled furnace for heating. Carry out experiment from a room temperature. Take out an experimental crucible at set intervals and weigh with an analytical balance. If the weight of a sample is not yet decreased in a certain temperature section, the temperature of the temperature control furnace should be improved. Then, the experimental crucible is taken out at set intervals and weighed, and heating is continued after reaching at another steady state.

The equilibrium temperature limit of four binary nitrate systems in the control group is 550° C. By heating for 100 h at 550° C. the loss rate can reach 10%; and by heating for 30 h, the loss rate reaches 5%. By heating for 100 h at 710° C. the loss rate can reach 25%; and by heating for 30 h, the loss rate reaches 13%.

The heat stability test is carried out on three groups of 18 heat transfer heat storage mediums obtained in embodiments 1-3.

TABLE 3

Statistical results of loss rate at 550° C.

| Product group No. | Time (hour) | |
|---|---|---|
| | 30 | 100 |
| The first group | <5% | <10% |
| The second group | <3.8% | <7% |
| The third group | <3.5% | <6.5% |
| The fourth group | <3.2% | <6.1% |
| The fifth group | <2.9% | <5.5% |
| The sixth group | <3% | <5% |

It can be seen that the heat stability of the products of each group can be significantly improved by adding silica sand at 550° C. relative to the contrast.

TABLE 4

Statistical results of loss rate at 710° C.

| Product group No. | Time (hour) 30 | Time (hour) 100 |
|---|---|---|
| The first group | <10.2% | <22% |
| The second group | <7.6% | <16.2% |
| The third group | <6.5% | <14.5% |
| The fourth group | <5.5% | <13.0% |
| The fifth group | <5.1% | <12% |
| The sixth group | <5.1% | <11% |

It can be seen that the heat stability of the products of each group can be significantly improved by adding very little silica sand at 710° C. relative to contrast.

Embodiments 4-7. Prepare Heat Transfer and Heat Storage Medium by Adding Silica Sand in Binary Nitrate System $KNO_3$—$NaNO_2$ Step 1. Prepare the material constituting the binary nitrate system according to the formula listed in Table 5. Put the same into a reaction kettle, heat and mix to fuse solid completely, and then insulate for 0.5-1 h. The heating temperature is 80-120° C. above the phase change temperature of the molten salt.

Step 2. Disperse the silica sand into the molten binary nitrate system under the condition of stirring and stir continuously for 1-2 h. The mixture is colloidal.

TABLE 5

Formula of binary nitrate system in each embodiment

| Embodiment No. | Binary nitrate system | Formula of binary nitrate system (part by weight) |
|---|---|---|
| 4 | KNO3—NaNO2 | Potassium nitrate: 30 parts; sodium nitrite: 70 parts |
| 5 | | Potassium nitrate: 40 parts; sodium nitrite: 60 parts |
| 6 | | Potassium nitrate: 45 parts; sodium nitrite: 55 parts |
| 7 | | Potassium nitrate: 55 parts; sodium nitrite: 45 parts |

The added silica sand (the specification is 100 meshes) is conducted according to the following proportional gradient:

The first group: silica sand accounts for 1% in four quartz sand composite binary molten nitrate salt based heat transfer heat storage mediums, and the $1^{st}$-$4^{th}$ products are obtained.

The second group: quartz sand accounts for 10% in four quartz sand composite binary molten nitrate salt based heat transfer heat storage mediums, and 5th-8th products are obtained.

The third group: quartz sand accounts for 20% in four quartz sand composite binary molten nitrate salt based heat transfer heat storage mediums, and 9th-12th products are obtained.

The fourth group: quartz sand accounts for 30% in four quartz sand composite binary molten nitrate salt based heat transfer heat storage mediums, and 13th-16th products are obtained.

The fifth group: quartz sand accounts for 40% in four quartz sand composite binary molten nitrate salt based heat transfer heat storage mediums, and the 17th-20th products are obtained.

The sixth group: quartz sand accounts for 50% in four quartz sand composite binary molten nitrate salt based heat transfer heat storage mediums, and 21st-24th products are obtained.

The contrast of each product is the corresponding binary nitrate salt of the product.

Step 3. Latent Heat of Phase Change Test and Melting Point Test:

The general differential scanning calorimeter DSC is used (scan at an ordinary pressure).

The test results show that, the latent heat of phase change is obviously increased by comparing with the contrast.

TABLE 6

Test results of melting point

| Quartz sand composite binary molten nitrate salt No. | Melting point (° C.) |
|---|---|
| Contrast: potassium nitrate: 30 parts; sodium nitrite: 70 parts | 207 |
| 1 | 197 |
| 5 | 195 |
| 9 | 193 |
| 13 | 199 |
| 17 | 213 |
| 21 | 220 |
| Contrast: potassium nitrate: 40 parts; sodium nitrite: 60 parts | 133 |
| 2 | 125 |
| 6 | 118 |
| 10 | 115 |
| 14 | 123 |
| 18 | 140 |
| 22 | 142 |
| Contrast: potassium nitrate: 45 parts; sodium nitrite: 55 parts | 132 |
| 3 | 122 |
| 7 | 121 |
| 11 | 119 |
| 15 | 126 |
| 19 | 138 |
| 23 | 141 |
| Contrast: potassium nitrate: 55 parts; sodium nitrite: 45 parts | 133 |
| 4 | 126 |
| 8 | 120 |
| 12 | 117 |
| 16 | 125 |
| 20 | 139 |
| 24 | 145 |

The melting points of the products in the 1st-4th group are decreased somewhat; and the melting points of the products in the fifth group and sixth group re increased somewhat.

Step 4. Heat Stability Test

The heat stability test is carried out on prepared 24 heat transfer heat storage mediums and contrasted 4 binary molten nitrate salts.

The test is carried out with the weighting method: put 24 molten salts obtained in embodiments 5-8 into the nickel crucible respectively put the same into the temperature-controlled furnace for heating. Carry out experiment from the room temperature and take out an experimental crucible at set intervals and weigh with the analytical balance. If the weight of the sample is not yet decreased in a temperature section, the temperature of the temperature-controlled furnace is improved. Then, the experimental crucible is taken out at set intervals and weighed, and heating is continued after arriving at another steady state.

The equilibrium temperature limit of four binary nitrate systems in the contrast is 500° C. By heating for 100 h at 500° C., the loss rate can reach 12%; and by heating for 30 h, the loss rate reaches 5%. By heating for 100 h at 600° C. the loss rate can reach 22%; and by heating for 30 h, the loss rate reaches 12%.

The heat stability test is carried out on six groups of 24 heat transfer heat storage mediums obtained in embodiments 4-7.

TABLE 7

Statistical results of loss rate at 500° C.

| Product group No. | Time (hour) | |
| --- | --- | --- |
|  | 30 | 100 |
| The first group | <5% | <10% |
| The second group | <3.6% | <7.5% |
| The third group | <3.7% | <7.0% |
| The fourth group | <3.2% | <6.1% |
| The fifth group | <2.9% | <5.5% |
| The sixth group | <3% | <5% |

It can be seen that, the heat stability of groups of products can be significantly improved by adding quartz sand at 500° C. relative to the contrast.

TABLE 8

Statistical results of loss rate at 800° C.

| Product group No. | Time (hour) | |
| --- | --- | --- |
|  | 30 | 100 |
| The first group | <9% | <20% |
| The second group | <7.6% | <17% |
| The third group | <6.5% | <12% |
| The fourth group | <5.8% | <10% |
| The fifth group | <5.6% | <8.4% |
| The sixth group | <5.3% | <7.9% |

It can be seen that, the heat stability of groups of products can be significantly improved by adding very little quartz sand at 600° C. relative to the contrast.

Embodiment 8-11 Add Silica Sand in Ternary Nitrate System $KNO_3$—$NaNO_3$—$NaNO_2$ to Prepare Heat Transfer and Heat Storage Medium Step 1 Prepare materials forming ternary nitrate molten salt system according to the formula listed in the table 9. Put them in the reactor, heat and stir to melt solid completely, and then insulate for 0.5-1 h. The heating temperature is 50-100° C. over the temperature of phase change of molten salt.

TABLE 9

Materials of Ternary Nitrate Molten Salt

| Number of embodiment | Ternary nitrate system | Formula of ternary nitrate molten salt (part by weight) |
| --- | --- | --- |
| 8 | $KNO_3$—$NaNO_3$—$NaNO_2$ | Potassium nitrate: 40 parts. Sodium nitrate: 15 parts. Sodium nitrite: 30 parts. |
| 9 |  | Potassium nitrate: 80 parts. Sodium nitrate: 5 parts. Sodium nitrite: 10 parts. |
| 10 |  | Potassium nitrate: 60 parts. Sodium nitrate: 15 parts. Sodium nitrite: 50 parts. |
| 11 |  | Potassium nitrate: 53 parts. Sodium nitrate: 7 parts. Sodium nitrite: 40 parts. |

Step 2: Under condition of stirring, disperse silica sand into molten ternary nitrate molten salt system and stir 1-2 h continuously until the mixture is gelatinous.

The added silica sand (specification is 100 meshes) is carried out according to the following The first group: Silica sand occupies 1% of four types of silica sands composite ternary nitrate heat transfer and heat storage medium. Obtain the first to the fourth products.

The second group: Silica sand occupies 10% of four types of silica sands composite ternary nitrate heat transfer and heat storage medium. Obtain the fifth to the eighth products.

The third group: Silica sand occupies 25% of four types of silica sands composite ternary nitrate heat transfer and heat storage medium. Obtain the ninth to the twelfth products.

The fourth group: Silica sand occupies 40% of four types of silica sands composite ternary nitrate heat transfer and heat storage medium. Obtain the thirteenth to the sixteenth products.

The fifth group: Silica sand occupies 50% of four types of silica sands composite ternary nitrate heat transfer and heat storage medium. Obtain the seventeenth to the twentieth products.

Step 3. Latent Heat of Phase Change Test and Melting Point Test

Adopt universal differential scanning calorimeter to scan (at atmospheric pressure)

Test results show that the intent heat of phase change is increased obviously compared with contrast. The melting point of the first group of the products to the third group of products keep unchanged. The melting points of the fourth group and the fifth group of products are improved slightly.

Step 4 Heat Stability Test

Contrasting ternary nitrate molten salt, carry out thermal stability test for the 20 kinds of heat transfer and heat storage mediums obtained from preparation.

Test is carried out by adopting gravimetric analysis: Put 20 kinds of molten salts obtained from embodiment 8-11 into nickel crucible and heat it in temperature-controlled furnace. Carry out experiment starting from normal temperature. Take out crucible of experiment at intervals to weigh it by analytical balance. If the sample weight is not reduced any more at certain temperature range, the temperature of temperature-controlled furnace should be increased and then take out crucible of experiment at intervals to weigh and raise temperature again continuously after reaching another steady state.

Contrast the stable temperature limit 500° C. of ternary nitrate system, the loss rate can reach 25% when it is heated for 100 hours at 500° C. The loss rate can reach 10% when it is heated for 30 hours at 500° C. The loss rate can reach 30% when it heated for 100 hours at 600° C. The loss rate can reach 15% when it is heated for 30 hours at 500° C. The loss rate can reach 35% when it is heated for 100 hours at 700° C. The loss rate can reach 24% when it is heated for 30 hours at 700° C.

Carry out thermal stability test for five groups of twenty kinds of heat transfer and heat storage mediums obtained from embodiment 8-11.

TABLE 10

Statistical Results of Loss Rate at 600° C.

| Product group no. | Time (hour) | |
|---|---|---|
| | 30 | 100 |
| The first group | 8~10% | 22~26% |
| The second group | 7~9% | 18~20% |
| The third group | 4~6% | 15~20% |
| The fourth group | 2~3% | 12~16% |
| The fifth group | 2~4% | 12~16% |

TABLE 11

The Statistical Results of Loss Rate at 700° C.

| Product group no. | Time (hour) | |
|---|---|---|
| | 30 | 100 |
| The first group | 15~20% | 25~30% |
| The second group | 12~15% | 20~23% |
| The third group | 10~13% | 18~20% |
| The fourth group | 8~12% | 15~18% |
| The fifth group | 9~12% | 15~18% |

It can be seen that the heat stability of the products of each group is increased obviously at 600° C. and 700° C. after adding silica sand relative to contrast.

Embodiment 12-14 Prepare Heat Transfer and Heat Storage Medium by Adding Silica Sand in Ternary Nitrate System $KNO_3$—$NaNO_3$—$Ca(NO_3)$ Step 1, 2 Prepare silica sand composite ternary nitrate according to the formula listed in table 12. The method is the same as the methods of step 1, 2 of embodiments 8-11.

TABLE 12

The Materials of Ternary Nitrate Molten Salt

| Ebodiment Number | Ternary Nitrate System | Ternary Nitrate System Formula (Part by Weight) |
|---|---|---|
| 12 | $KNO_3$—$NaNO_3$—$Ca(NO_3)_2$ | Potassium nitrate: 45 parts. Sodium nitrate: 7 parts. Calcium nitrate: 48 parts. |
| 13 | | Potassium nitrate: 29.97 parts. Sodium nitrate: 20.53 parts. Calcium nitrate: 49.5 parts. |
| 14 | | Potassium nitrate: 22.97 parts. Sodium nitrate: 11.89 parts. Calcium nitrate: 65.32 parts. |

The adding of silica sand is carried out according to gradient.

The first group: silica sand occupies 1% of three kinds of silica sand composite ternary nitrate molten salt heat transfer and heat storage medium. The 1st-3rd products are obtained.

The second group: silica sand occupies 30% of four kinds of silica sand composite ternary nitrate molten salt heat transfer and heat storage. The 4th-6th products are obtained.

The third group: silica sand occupies 50% of four kinds of silica sand composite ternary nitrate molten salt heat transfer and heat storage. The 7th-9th products are obtained.

Step 3 Latent Heat of Phase Change Test and Melting Test

Adopt universal differential scanning calorimeter DSC (scan at normal pressure)

Test result shows that the latent heat of phase change is increased obviously. Compared with the contrast, the melting points of the first group and the second group keep unchanged basically. The melting point of the third group is improved obviously.

Step 4 Heat Stability Test

Carry out heat stability test on prepared nine kinds of heat transfer and heat storage mediums by contrasting ternary nitrate molten salt.

Test is carried out by adopting weighting method: Put nine kinds of molten salt obtained from embodiment 12-14 into silver crucible and heat them in the temperature-controlled furnace. Carry out experiment starting from normal temperature and take out experimental crucible at intervals and weigh by using analytic balance. If the weight of sample is not reduced any more at certain temperature section, the temperature of temperature-controlled furnace should be improved and then take out experimental crucible at intervals to weigh and rise temperature continuously again after reaching another stable status.

The limit is 550° C. by contrasting the stable temperature of ternary nitrate system. At 550° C. heat for 30 hours, and then the loss rate is around 3%. Heat for 50 hours, and then loss rate is around 6%. At 650° C. heat for 30 hours, the loss rate is around 5%. Heat for 50 hours, and then the loss rate is around 10%. At 750° C. heat for 30 hours, the loss rate is around 7%. The loss rate is around 15% when it is heated for 50 hours. The loss rate is around 7% when it is heated for 30 hours. The loss rate is around 12% when it is heated for 50 hours.

Carry out heat stability test on three groups of nine kinds of heat transfer and heat storage mediums obtained from embodiments 12-14.

TABLE 13

Statistical Results of Loss Rate at 650° C.

| Product group no. | Time (hour) | |
|---|---|---|
| | 30 | 50 |
| The first group | <4% | <8% |

TABLE 13-continued

Statistical Results of Loss Rate at 650° C.

| Product group no. | Time (hour) | |
|---|---|---|
| | 30 | 50 |
| The second group | <3% | <6% |
| The third group | <2.5% | <4% |

TABLE 14

The Statistical Result of Loss Rate at 750° C.

| Product group no. | Time (hour) | |
|---|---|---|
| | 30 | 50 |
| The first group | <5% | <12% |
| The second group | <4% | <9% |
| The third group | <3% | <6.5% |

It can be seen that the loss rate of the invented products at 750° C. is close to that of contrast at 550° C. It means that the invented product possesses better heat stability and can be operated for long time stably at 750° C.

Embodiments 15-17 Prepare Heat Transfer and Heat Storage Medium by Adding Silica Sand in Polybasic Nitrate System $KNO_3$—$NaNO_3$—$NaNO_2$—$CsNO_3$ Step 1. Preparation of Silica Sand Composite Polybasic Nitrate Molten Salt Products 1-3

Prepare the materials constituting polybasic nitrate molten salt system according to the formula 15~17 listed in table 15. Add silica sand after heating and stirring evenly and heat and stir continuously to degas and dewater. The heating temperature is 80-120° C. above the temperature of phase change of molten salt.

Disperse silica sand (100 meshes) into molten polybasic nitrate molten salt system. Stir the molten mixture for 1-2 h and obtain the silica sand composite polybasic nitrate molten salt heat transfer and heat storage medium. Silica sand occupies 1%, 20%, 50% in the products 1-3 respectively.

TABLE 15

Poly-basic Nitrate System Formula in Each Embodiment

| Embodiment Number | Polybasic nitrate system | Polybasic nitrate system formula |
|---|---|---|
| 15 | $KNO_3$—$NaNO_3$—$NaNO_2$—$CsNO_3$ system | Potassium nitrate 80 parts. Sodium nitrate 5 parts. Sodium nitrite 20 parts. Cesium nitrate 1 part. |
| 16 | | Potassium nitrate 40 parts. Sodium nitrate 15 parts. Sodium nitrite 50 parts. Cesium nitrate 10 part. |
| 17 | | Potassium nitrate 60 parts. Sodium nitrate 10 parts. Sodium nitrite 30 parts. Cesium nitrate 5 parts. |
| 18 | $KNO_3$—$NaNO_3$—$NaNO_2$—$Ca(NO3)_2$ system | Potassium nitrate 40 parts. Sodium nitrate 15 parts. Sodium nitrite 50 parts. Cesium nitrate 10 parts. |
| 19 | | Potassium nitrate 80 parts. Sodium nitrate 5 parts. Sodium nitrite 20 parts. Cesium nitrate 1 part. |
| 20 | | Potassium nitrate 60 parts. Sodium nitrate 10 parts. Sodium nitrite 30 parts. Cesium nitrate 5 parts. |
| 21 | $KNO_3$—$NaNO_3$—$NaNO_2$—$LiNO_3$ system | Potassium nitrate 80 parts. Sodium nitrate 5 parts. Sodium nitrite 20 parts. Cesium nitrate 1 part. |
| 22 | | Potassium nitrate 40 parts. Sodium nitrate 15 parts. Sodium nitrite 50 parts. Cesium nitrate 10 parts. |
| 23 | | Potassium nitrate 60 parts. Sodium nitrate 10 parts. Sodium nitrite 40 parts. Cesium nitrate 8 parts. |
| 24 | $KNO_3$—$NaNO_3$—$CsNO_3$—$Ca(NO_3)_2$ system | Potassium nitrate 80 parts. Sodium nitrate 5 parts. Sodium nitrite 20 parts. Cesium nitrate 5 parts. |
| 25 | | Potassium nitrate 60 parts. Sodium nitrate 10 parts. Sodium nitrite 40 parts. Cesium nitrate 10 parts. |
| 26 | | Potassium nitrate 40 parts. Sodium nitrate 15 parts. Sodium nitrite 50 parts. Cesium nitrate 1 part. |
| 27 | $KNO_3$—$NaNO_3$—$LiNO_3$—$CsNO_3$ system | Potassium nitrate 60 parts. Sodium nitrate 8 parts. Sodium nitrite 20 parts. Cesium nitrate 10 parts. |
| 28 | | Potassium nitrate 80 parts. Sodium nitrate 5 parts. Sodium nitrite 30 parts. Cesium nitrate 10 parts. |

TABLE 15-continued

Poly-basic Nitrate System Formula in Each Embodiment

| Embodiment Number | Polybasic nitrate system | Polybasic nitrate system formula |
|---|---|---|
| 29 | | Potassium nitrate 40 parts. Sodium nitrate 15 parts. Sodium nitrite 50 parts. Cesium nitrate 6 parts. |
| 30 | $KNO_3$—$NaNO_3$—$NaNO_2$—$CsNO_3$—$Ca(NO_3)_2$ system | Potassium nitrate 70 parts. Sodium nitrate 5 parts. Sodium nitrite 30 parts. Cesium nitrate 10 parts. Calcium nitrate 20 parts. |
| 31 | | Potassium nitrate 40 parts. Sodium nitrate 15 parts. Sodium nitrite 50 parts. Cesium nitrate 20 parts. Calcium nitrate 30 parts. |
| 32 | | Potassium nitrate 80 parts. Sodium nitrate 10 parts. Sodium nitrite 10 parts. Cesium nitrate 30 parts. Calcium nitrate 10 parts. |

Step 2. The Heat Stability Test of Silica Sand Composite Polybasic Nitrate Molten Salt Product 1-3

Carry out heat stability test on prepared heat transfer and heat storage medium by contrasting polybasic nitrate molten salt.

Test is carried out by adopting weighting method: put 3 kinds of molten salts into nickel crucible respectively obtained in embodiment 15-17. Put them into temperature-controlled furnace to heat. Carry out experiment starting from normal temperature. Take out experimental crucible at intervals to weigh by using analytic balance. If the weight of sample is not reduced any more at certain temperature section, the temperature of temperature-controlled furnace should be increased, and then take out experimental crucible to weigh at intervals and increase temperature continuously after reaching another stable state.

Results show:

Insulate the molten salts of silica sand composite polybasic nitrate products 1-3 for 120 hours. The loss rate is less than 1%.

Insulate them for 30 hours at 700° C. The loss rates of three products are 20%, 3% and 1% respectively.

Contrasting three kinds of polybasic nitrate molten salts without silica sand (the corresponding system of no. 1-3 of embodiments 15-17 in table 15), the loss rate is around 8% for operating 30 hours at 600° C. It has obvious loss at 700° C. The loss rate reaches 25% when it operates to 30 hours.

It means that the stability of nitrate molten salt system at the high temperature can be improved and the operating upper limit temperature can be improved after adding silica sand.

Step 3. The Latent Heat of Phase Change Test and Melting Point Test of Silica Sand Composite Polybasic Nitrate Molten Salt Products 1-3

Adopt universal differential scanning calorimeter DSC (scan at normal pressure).

Test results show that the latent heat of phase change in increased obviously comparing with contrast. The melting points of product 1 and product 2 keep unchanged basically. The melting point of product 3 is increased slightly.

Embodiments 18-20 Prepare Heat Transfer and Heat Storage Medium by Adding Silica Sand in Polybasic Nitrate System $KNO_3$—$NaNO_3$—$NaNO_2$—$Ca(NO_3)_2$ Prepare materials constituting polybasic nitrate molten salt system according to the formula listed in table 15.

The preparation method of products 4-6 are the same with embodiments 15-17 exactly. Silica sand (100 meshes) occupies 10%, 25% and 40% respectively. Contrasting molten salt without silica sand, it is the system corresponding with that in embodiments 15-17 in table 15.

The heat stability test result is close to embodiments 15-17. The loss rates of the prepared three products of this invention are 10%, 3% and 1% respectively after insulating for 30 hours at 700° C. It is 28% higher that the highest of the contrast obviously.

Adopt universal differential scanning calorimeter DSC (scan at normal pressure). The test results show that the latent heat of phase change is increased obviously comparing with contrast and the melting point keeps unchanged basically.

Embodiments 21-23 Prepare Heat Transfer and Heat Storage Medium by Adding Silica Sand in Polybasic Nitrate System $KNO_3$—$NaNO_3$—$NaNO_2$—$LiNO_3$ Prepare the materials constituting polybasic nitrate molten salt according to the formula listed in table 15.

Preparation method and test method are exactly same as the embodiments 15-17.

The added silica sand (100 meshes) of product 7-9 occupies 15%, 30% and 45%.

The test result of heat stability is close to embodiments 15-17. The highest loss rates of the prepared three kinds of products of the invention are 12%, 4% and 2% which is 30% lower than the contrast obviously.

Adopt universal differential scanning calorimeter DSC (scan at normal pressure). The test result shows that the melting points of product 7-9 keep unchanged basically and the latent heat of phase change in increased.

Embodiments 24-26 Prepare Heat Transfer and Heat Storage Medium by Adding Silica Sand in Polybasic Nitrate System $KNO_3$—$NaNO_3$—$CsNO_3$—$Ca(NO_3)_2$ The preparation method and test method of products 10-12 are the exactly same as embodiments 15-17.

Silica sand (100 meshes) occupies 10%, 25% and 45% respectively. Contrasting molten sand without silica sand, it is the system corresponding with embodiments 25-27 in table 15.

The test result of heat stability is close to embodiments 15-17. The highest loss of rate of three kinds of products prepared by the invention are 12%, 3% and 2% which is 30% lower than the contrast obviously.

Adopt universal differential scanning calorimeter DSC (scan at normal pressure). The test result shows that the latent heat of phase change is increased comparing with the contrast, the melting points of product 10-11 keep unchanged basically and the melting point of product 12 is improved slightly.

Embodiment 27-32 Prepare Heat Transfer and Heat Storage Medium by Adding Silica Sand in Other Polybasic Nitrate System The preparation method and test method of product 13-18 is exactly same as the embodiments 16-18. The proportion of silica sand (100 meshes) of three formulas of each polybasic nitrate molten salt system are: 15%, 25% and 40%. Comparing with the molten salt without silica sand, it is the system corresponding with embodiments 27-32 in table 15.

The heat stability test result shows that the highest loss rates of six kinds of products prepared by the invention are 11%, 2.5% and 1% which is 30% lower that the contrast obviously at 700° C. after insulating for 30 hours.

Adopt universal differential scanning calorimeter DSC (scan at normal pressure). The test results show that the melting point of products 13-18 keeps unchanged and the latent heat of phase change is increased comparing with the contrast.

The above experiment results show that the heat transfer and heat storage medium prepared by adding the silica sand in polybasic nitrate molten salt has slight corrosion on heat transfer and heat storage system. It has the following advances:

It has the performance of heat transfer of nitrate molten salt and the upper limit operating temperature of polybasic nitrate is increased too. The operating temperature range is more wide and the heat stability is good.

Large latent heat of phase change and high energy storage density lower the requirements on the size of heat storage system and energy. The utilization rate of energy is high and the energy-saving effect is good.

The performance of conductivity for heat of the molten salt heat transfer and heat storage prepared by the invention is increased greatly. The shortcomings of poor performance of conductivity of nitrate molten salt and local overheating are overcame. It can be used widely in solar thermal power generation technical field.

Embodiment 33-36. Silica Sand Binary Carbonate Composite System

The formula of binary carbonate system is shown as table 16.

TABLE 16

The formula of binary carbonate molten salt in each embodiment

| Embodiment no. | Binary carbonate system | Binary carbonate system formula (part by weight)-comparison |
|---|---|---|
| 33 | $K_2CO_3$—$Na_2CO_3$ | Potassium carbonate: 30 parts. Sodium carbonate: 45 parts. |
| 34 | | Potassium carbonate: 45 parts. Sodium carbonate: 30 parts. |
| 35 | | Potassium carbonate: 60 parts. Sodium carbonate: 30 parts. |
| 36 | | Potassium carbonate: 30 parts. Sodium carbonate: 60 parts. |

Step 1. Prepare the materials constituting binary carbonate molten salt system according to the formula listed in table 16. Put them in the reactor, heat and stir to melt solid completely and then insulate for 0.5-1 h. The heating temperature is 80-120° C. over the temperature of phase change of molten salt.

Step 2. Disperse silica sand according to the proportion designed by the following experiments into molten binary carbonate salt and stir 1-2 h continuously to get silica sand composite carbonate molten salt which is colloidal.

The silica sand (specification is 100 meshes) is added for the experimental design of the invention according to the following proportion gradient:

The first group: silica sand occupies 1% of four kinds of silica sand composite binary carbonate molten salt heat transfer and heat storage medium. Obtain the first to the fourth products.

The second group: silica sand occupies 10% of four kinds of silica sand composite binary carbonate molten salt heat transfer and heat storage medium. Obtain the fifth to the eighth products.

The third group: silica sand occupies 20% of four kinds of silica sand composite binary carbonate molten salt heat transfer and heat storage medium. Obtain the ninth to the twelfth products.

The fourth group: silica sand occupies 30% of four kinds of silica sand composite binary carbonate molten salt heat transfer and heat storage medium. Obtain the 13th to the sixth products.

The fifth group: silica sand occupies 40% of four kinds of silica sand composite binary carbonate molten salt heat transfer and heat storage medium. Obtain the $17^{th}$ to the 20th products.

The sixth group: silica sand occupies 50% of four kinds of silica sand composite binary carbonate molten salt heat transfer and heat storage medium. Obtain the 21st to the $24^{th}$ products.

The contrast of each one product is the system of the corresponding original binary carbonate molten salt system of the product.

Step 3. Latent Heat of Phase Change Test and Melting Point Test:

Adopt universal differential scanning calorimeter DSC (scan at normal pressure).

Test results show that the latent heat of phase change is increased obviously comparing with the contrast.

The melting points of the products of the first group to the fourth group is reduced. The melting points are between 530~560° C. The melting points of the products of the fifth group to that of the sixth group are improved slightly. It is around 600° C.

Step 4. Heat Stability Test

Carry out heat stability test for the obtained 24 kinds of heat transfer and heat storage mediums and four kinds of contrast binary carbonate molten salt The test is carried out by adopting weighting method: put 24 kinds of molten salts obtained in the embodiments 33-36 into nickel crucible and heat it in the temperature-controlled furnace. Carry out experiment starting from normal temperature. Take out experimental crucible at intervals and weigh by using analytical balance. If the weight of the sample is not reduced any more at certain temperature section, the temperature of the temperature-controlled furnace should be increased, and then take out experimental crucible at intervals to weigh and increase temperature after reaching another stable status.

The result show that the heat stability of four kinds of the contrasts binary carbonate system is shown as follows:
Heat for 100 hours at 800° C. The loss rate is 8%.
Heat for 30 hours at 850° C. The loss rate is 8%.
Heat for 30 hours at 900° C. The loss rate is 12%.
Carry out heat stability test on 6 groups of 24 kinds of heat transfer and heat storage mediums obtained in embodiments 33-36. The results are shown on the table 17.

TABLE 17

The statistical results of loss rate at each temperature

| | Time (hour) | | |
|---|---|---|---|
| Product group no. | 800° C. (100 hours) | 850° C. (30 hours) | 900° C. (30 hours) |
| The first group | <8% | <8% | <12% |
| The second group | <7% | <7% | <10.5% |
| The third group | <6% | <6% | <8.5% |
| The fourth group | <5% | <5% | <7% |
| The fifth group | <4.5% | <4.5% | <6% |
| The sixth group | <4% | <4% | <5.5% |

It can be seen that the heat stability of the products of each group is increased relative to contrast after adding silica sand.

Embodiments 37-40 Silica Sand-Molten Salt Composite System Containing Lithium Carbonate See table 18 for the molten salt system containing lithium carbonate.

Step 1. Prepare materials constituting molten salt system containing lithium carbonate according to the formula listed in table 18. Heat it in the reaction kettle and stir to melt solid completely and then insulate for 0.5-1 h. The heating temperature is 80-120° C. over the temperature of phase change of molten salt.

Step 2. Disperse silica sand into molten molten salt containing lithium carbonate according to the proportion designed by experiment and stir continuously for 1-2 h to obtain silica sand composite carbonate molten salt which is colloidal.

The silica sand (specification 100 meshes) is added according to the following proportional gradient and design of the experiment.

The first group: Silica sand occupies 1% of four kinds of silica sand composite carbonate molten salt heat transfer and heat storage mediums. Obtain the $25^{th}$ to $28^{th}$ products.
The second group: Silica sand occupies 10% of four kinds of silica sand composite carbonate molten salt heat transfer and heat storage mediums. Obtain the $29^{th}$ to $32^{nd}$ products.
The third group: Silica sand occupies 20% of four kinds of silica sand composite carbonate molten salt heat transfer and heat storage mediums. Obtain the 33rd to $36^{th}$ products.
The fourth group: Silica sand occupies 30% of four kinds of silica sand composite carbonate molten salt heat transfer and heat storage mediums. Obtain the $37^{th}$ to $40^{th}$ products.
The fifth group: Silica sand occupies 40% of four kinds of silica sand composite carbonate molten salt heat transfer and heat storage mediums. Obtain the $41^{st}$ to $44^{th}$ products.
The sixth group: Silica sand occupies 50% of four kinds of silica sand composite carbonate molten salt heat transfer and heat storage mediums. Obtain the $45^{th}$ to $48^{th}$ products.

The contrast of each product is the corresponding molten salt system containing lithium carbonate of the product.

Step 3 Latent Heat of Phase Change Test and Melting Test

Adopt universal differential scanning calorimeter DSC (scan at normal pressure).

Test results show that the latent heat of phase change is increased obviously comparing with the contrast.

As far as the contrast is concerned,

The melting points of the products of the first group to the fourth group are reduced. The melting point is between 320~380 degrees Celsius The melting points of the fifth group and the sixth group are improved slightly which is around 400–410° C.

Step 4 Thermal Stability Test

Carry out heat stability test on prepared and obtained 24 kinds of heat transfer and heat storage mediums and four kinds of contrasts of molten salt containing lithium carbonate.

TABLE 18 the formula of molten salt containing lithium carbonate

| Number of embodiment | Molten salt containing lithium carbonate | Formula of molten salt containing lithium carbonate(part by weight)-contrast |
|---|---|---|
| 37 | $K_2CO_3$—$Na_2CO_3$—NaCl—$Li_2CO_3$ | Potassium carbonate: 20 parts. Sodium carbonate: 40 parts. Sodium chloride: 20 parts. Lithium carbonate: 10 parts. |
| 38 | | Potassium carbonate: 25 parts. Sodium carbonate: 35 parts. Sodium chloride: 10 parts. Lithium carbonate: 8 parts. |
| 49 | | Potassium carbonate: 45 parts. Sodium carbonate: 25 parts. Sodium chloride: 20 parts. Lithium carbonate: 5 parts. |
| 40 | | Potassium carbonate: 60 parts. Sodium carbonate: 20 parts. Sodium chloride: 10 parts. Lithium carbonate: 10 parts. |

The test is carried out by adopting weighting method: put 24 kinds of molten salts obtained in embodiments 37-40 into nickel crucible respectively and heat it in the temperature-controlled furnace. Experiment starting from room temperature and take out experimental crucible at intervals and weigh by using analytical balance. If the weight of the sample is not reduced any more at certain temperature section, the temperature of temperature-controlled furnace should be increased, and then take out experiment crucible to weigh at intervals and increase temperature continuously after reaching another stable status.

Results show that the thermal stability of four contrasts containing lithium carbonate system is shown as follows:
Heat for 100 hours at 850° C. The loss rate is around 5%.
Heat for 30 hours at 900° C. The loss rate is around 6%.
Heat for 30 hours at 950° C. The loss rate is around 10%.

Carry out heat stability test on six groups of 24 kinds of heat transfer and heat storage mediums obtained in embodiments 37-40. The result is shown on the table 19.

TABLE 19

Statistical Result of Loss Rate at Each Temperature

| Product group no. | Time (hour) | | |
|---|---|---|---|
| | 850° C. (100 hours) | 900° C. (30 hours) | 950° C. (30 hours) |
| The first group | <4.9% | <5.6% | <9% |
| The second group | <4.2% | <4.8% | <8% |
| The third group | <3.8% | <4.3% | <7.1% |
| The fourth group | <3.3% | <3.7% | <5.8% |
| The fifth group | <3% | <3.2% | <5.5% |
| The sixth group | <2.5% | <3% | <5.1% |

It can be seen that the heat stability of the products of each group is increased obviously after adding silica sand relative to contrasts.

Embodiments 41-43. Add Graphite in Ternary Nitrate System $KNO_3$—$NaNO_3$—$Ca(NO_3)$ to Prepare Heat Transfer and Heat Storage Medium Adopt the ternary nitrate molten salt system of embodiment 12-14. The method is the same as the method of step 1 of embodiments 8-11.
Add graphite according to gradient.
Embodiment 41 is the first group: Graphite occupies 1% of three kinds of silica sand composite ternary nitrate molten salt heat transfer and heat storage medium. Obtain the first one to the third products.
Embodiment 42 is the second group: Graphite occupies 30% of three kinds of silica sand composite ternary nitrate molten salt heat transfer and heat storage medium. Obtain the fourth to the sixth products.
Embodiment 43 is the third group: Graphite occupies 50% of three kinds of silica sand composite ternary nitrate molten salt heat transfer and heat storage medium. Obtain the seventh to the ninth products.

Step 3. Latent Heat of Phase Change Test and Melting Point Test
Adopt universal differential scanning calorimeter to scan (at normal pressure)

Test results show that the latent heat of phase change is increased obviously. Compared with contrast, the melting points of the first group and the second group keep unchanged basically. The melting point of the third group is improved.

Step 4 Thermal Stability Test
Carry out heat stability test on prepared and obtained nine kinds of heat transfer and heat storage mediums by comparing ternary nitrate molten salt.
Test is carried out by adopting weighting method: put nine kinds of molten salts into nickel crucible respectively and heat it in temperature-controlled furnace. Experiment starting from room temperature. Take out experiment crucible at intervals to weigh by using analytical balance. If the weight of the sample is not reduced any more, the temperature of temperature-controlled furnace should be increased, and then take out experiment crucible at intervals to weigh and increase temperature after reaching another stable status.

Contrasting the stable temperature limit 550° C. of ternary nitrate system, when it is heated for 30 hours at 550° C. the loss rate is around 3%. The loss rate is around 8% when it is heated for 50 hours at 550° C. When it is heated for 30 hours at 650° C. the loss rate is around 5.5%. When it is heated for 50 hours, the loss rate is around 12%. When it is heated for 30 hours at 750° C. the loss rate is around 9%. When it is heated for 50 hours, the loss rate is around 17% at 750° C.

Carry out thermal stability test for nine kinds of heat transfer and heat storage mediums obtained from embodiments 41-43.

TABLE 19

Statistical Results of Loss Rate at 650° C.

| Product group no. | Time (hour) | |
|---|---|---|
| | 30 | 50 |
| The first group | <4% | <8% |
| The second group | <3.5% | <6.8% |
| The third group | <2.9% | <5.8% |

TABLE 20

The statistical results of loss rate at 750° C.

| Product group no. | Time (hour) | |
|---|---|---|
| | 30 | 50 |
| The first group | <6% | <14% |
| The second group | <5% | <12% |
| The third group | <4.5% | <11.2% |

It can be seen that the loss rate of the invented product at 750° C. is close to that of contrast at 550° C. The result is close to that with silica sand added. It can be operated stably for long time at 750° C.

The invention claimed is:
1. A heat transfer and storage medium comprising silica sand compounded with a heat transfer and storage molten salt system, wherein a weight proportion of said silica sand in said heat transfer and storage medium is 10% to 50%, said heat transfer and storage molten salt system selected from a group consisting of a binary nitrate molten salt system and a ternary nitrate molten salt system, wherein:

the binary nitrate molten salt system is a $KNO_3$—$NaNO_2$ system comprising, in relative parts by weight, 30-40 parts potassium nitrate, and 60-70 parts sodium nitrite; and the ternary nitrate molten salt system is a $KNO_3$—$NaNO_3$—$NaNO_2$ system selected from a group consisting of following formulas, in relative part by weight:

40 parts potassium nitrate, 15 parts sodium nitrate and 30 parts sodium nitrite;

80 parts potassium nitrate, 5 parts sodium nitrate and 10 parts sodium nitrite; and 60 parts potassium nitrate, 15 parts sodium nitrate and 50 parts sodium nitrite.

2. The heat transfer and storage medium according to claim 1, wherein:

the weight proportion of said silica sand in said heat transfer and storage medium is 10% to 40%.

3. The heat transfer and storage medium according to claim 1, wherein:

the weight proportion of said silica sand in said heat transfer and storage medium is 20% to 45%.

4. The heat transfer and storage medium according to claim 1, wherein:

the weight proportion of said silica sand in said heat transfer and storage medium is 30% to 40%.

\* \* \* \* \*